(12) United States Patent
Liu (10) Patent No.: US 10,906,251 B1
(45) Date of Patent: Feb. 2, 2021

(54) METHOD OF CONSTRUCTING A SPACE CONSTRUCTION AND PRODUCT THEREOF

(71) Applicant: Yueh-Ming Liu, Taichung (TW)

(72) Inventor: Yueh-Ming Liu, Taichung (TW)

(*) Notice: Subject to any disclaimer, the term of this patent is extended or adjusted under 35 U.S.C. 154(b) by 79 days.

(21) Appl. No.: 16/522,751

(22) Filed: Jul. 26, 2019

(51) Int. Cl.
| | |
|---|---|
| *B32B 3/24* | (2006.01) |
| *B29C 70/02* | (2006.01) |
| *C04B 28/02* | (2006.01) |
| *C04B 14/06* | (2006.01) |
| *C04B 14/30* | (2006.01) |
| *C04B 20/00* | (2006.01) |
| *C04B 24/36* | (2006.01) |
| *C04B 24/26* | (2006.01) |
| *C04B 40/00* | (2006.01) |
| *E01C 19/46* | (2006.01) |
| *E04H 9/16* | (2006.01) |
| *B29C 70/24* | (2006.01) |
| *C04B 111/00* | (2006.01) |
| *B29K 33/04* | (2006.01) |
| *B29K 233/04* | (2006.01) |
| *B29K 509/08* | (2006.01) |
| *B29K 509/02* | (2006.01) |
| *B32B 3/26* | (2006.01) |

(52) U.S. Cl.
CPC ............ *B29C 70/025* (2013.01); *B29C 70/24* (2013.01); *C04B 14/06* (2013.01); *C04B 14/305* (2013.01); *C04B 20/004* (2013.01); *C04B 20/0032* (2013.01); *C04B 20/0068* (2013.01); *C04B 24/2641* (2013.01); *C04B 24/36* (2013.01); *C04B 28/02* (2013.01); *C04B 40/0046* (2013.01); *E01C 19/46* (2013.01); *E04H 9/16* (2013.01); *B29K 2033/04* (2013.01); *B29K 2233/04* (2013.01); *B29K 2509/02* (2013.01); *B29K 2509/08* (2013.01); *B29K 2995/0018* (2013.01); *B32B 3/266* (2013.01); *C04B 2111/00612* (2013.01); *C04B 2111/00732* (2013.01); *C04B 2111/00862* (2013.01); *Y10T 428/24331* (2015.01)

(58) Field of Classification Search
CPC ...................................................... B32B 3/266
See application file for complete search history.

(56) References Cited

U.S. PATENT DOCUMENTS

| | | | | |
|---|---|---|---|---|
| 8,138,673 | B1 * | 3/2012 | Wedding | H01J 47/02 313/582 |
| 2003/0168637 | A1 * | 9/2003 | McCord | G21F 1/106 252/500 |
| 2008/0128658 | A1 * | 6/2008 | Jungermann | G21F 1/10 252/478 |

* cited by examiner

Primary Examiner — William P Watkins, III
(74) Attorney, Agent, or Firm — WPAT, PC (57) ABSTRACT

A method of constructing a space construction has a preparing step, a first mixing step, a second mixing step, a matrix layer building step, a three-dimensional fiber webs paving step, and a gamma ray screening layer building step. Prepare an agitator, a strengthening material, a composite material, multiple three-dimensional fiber webs, and multiple gamma ray screening elements. Mix the strengthening material and the composite material to form a first building material. Mix the multiple gamma ray screening elements and soil on a planet to form a second building material. Build at least one matrix layer with the first building material. Pave two three-dimensional fiber webs on the at least one matrix layer. Build at least one gamma ray screening layer adjacent to one of the two three-dimensional fiber webs with the second building material. A product constructed by the method is also provided.

20 Claims, 7 Drawing Sheets

METHOD OF CONSTRUCTING A SPACE CONSTRUCTION AND PRODUCT THEREOF

BACKGROUND OF THE INVENTION

1. Field of the Invention

The present invention relates to a method of constructing a space construction and product thereof, and more particularly to a method of constructing a space construction which can coagulate without a huge quantity of water and is capable of screening dwellers from gamma rays.

2. Description of Related Art

Concrete is a building material largely utilized on Earth to build important constructions such as buildings, roads, and bridges. With the capability to quickly harden, concrete is undoubtedly one of the most popular building materials. The hardening of concrete is caused by a chemical reaction called hydration between cement and a huge quantity of water. However, when it comes to constructions on other planets such as Mars, the technical issue such as how to obtain sufficient water to react with cement is still a critical problem left unsolved.

Moreover, gamma rays in the universe are fatal high-energy form of electromagnetic radiations to living creatures. Without the protection of the Earth's atmosphere, gamma rays would wipe out all living creatures on Earth. Therefore, how to build constructions capable of protecting dwellers from gamma rays on a planet without the atmosphere is also a crucial issue.

To overcome the shortcomings, the present invention provides a method of constructing a space construction and product thereof to mitigate or obviate the aforementioned problems.

SUMMARY OF THE INVENTION

The main objective of the present invention is to provide a space construction and a method of constructing a space construction which can coagulate without a huge quantity of water and capable of screening dwellers from gamma rays.

The method of constructing a space construction in accordance with the present invention comprises a preparing step, a first mixing step, a second mixing step, a matrix layer building step, a three-dimensional fiber webs paving step, and a gamma ray screening layer building step. In the preparing step, prepare an agitator, a strengthening material, a composite material, multiple three-dimensional fiber webs, and multiple gamma ray screening elements. The strengthening material is composed of a moldable and curable material, water, and air. The water and air are mixed with the moldable and curable material. The composite material comprises cement, a matrix material, and a reinforcement material.

The matrix material is composed of water, hydrogenated light paraffin, titanium dioxide, amorphous silicon dioxide, acrylic copolymer, butyl acrylate, 2-hydroxyethyl acrylate, styrene, acrylic acid, and poly(methyl methacrylate). Each one of the multiple three-dimensional fiber webs has two surfaces and multiple fiber web units. The two surfaces face two opposite directions, respectively. The multiple fiber web units of the three-dimensional fiber web are disposed adjacently on the three-dimensional fiber web. Each one of the multiple fiber web units has a major through hole and multiple fibers. The major through hole is formed through the two surfaces of the three-dimensional fiber web. The multiple fibers are braided to form the fiber web unit, and surround the major through hole of the fiber web unit. Each one of the fibers is braided by multiple fiber threads with multiple minor through holes. Each one of the multiple gamma ray screening elements comprises a glass ball and at least one kind of gas that composes the atmosphere. The at least one kind of gas composing the atmosphere is filled in the glass ball.

In the first mixing step, mix the strengthening material and the composite material with the agitator to form a first building material. In the second mixing step, mix the multiple gamma ray screening elements and soil on a planet with the agitator to form a second building material. In the matrix layer building step, build at least one matrix layer having two sides with the first building material in the first mixing step. In the three-dimensional fiber webs paving step, pave two of the three-dimensional fiber webs on the two sides of the at least one matrix layer respectively. In the gamma ray screening layer building step, build at least one gamma ray screening layer adjacent to one of the two three-dimensional fiber webs with the second building material in the second mixing step to build up an initial structure.

The space construction in accordance with the present invention comprises at least one matrix layer, at least two three-dimensional fiber webs, and at least one gamma ray screening layer. The at least one matrix layer has two sides and is composed of a strengthening material and a composite material. The strengthening material is composed of a moldable and curable material, water, and air. The water and air are mixed with the moldable and curable material. The composite material comprises cement, a matrix material, and a reinforcement material. The matrix material is composed of water, hydrogenated light paraffin, titanium dioxide, amorphous silicon dioxide, acrylic copolymer, butyl acrylate, 2-hydroxyethyl acrylate, styrene, acrylic acid, and poly(methyl methacrylate). The at least two three-dimensional fiber webs are paved on the two sides of the at least one matrix layer, respectively. Each one of the multiple three-dimensional fiber webs has two surfaces and multiple fiber web units. The two surfaces face two opposite directions, respectively. The multiple fiber web units of the three-dimensional fiber web are disposed adjacently on the three-dimensional fiber web.

Each one of the multiple fiber web units has a major through hole and multiple fibers. The major through hole is formed through the two surfaces of the three-dimensional fiber web. The multiple fibers are braided to form the fiber web unit, and surround the major through hole of the fiber web unit. Each one of the fibers is braided by multiple fiber threads with multiple minor through holes. The at least one gamma ray screening layer is adjacent to one of the at least two three-dimensional fiber webs, and is composed of multiple gamma ray screening elements and soil on a planet. Each one of the multiple gamma ray screening elements comprises a glass ball and at least one kind of gas that composes the atmosphere. The at least one kind of gas composing the atmosphere is filled in the glass ball. The soil on the planet is mixed with the multiple gamma ray screening elements.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
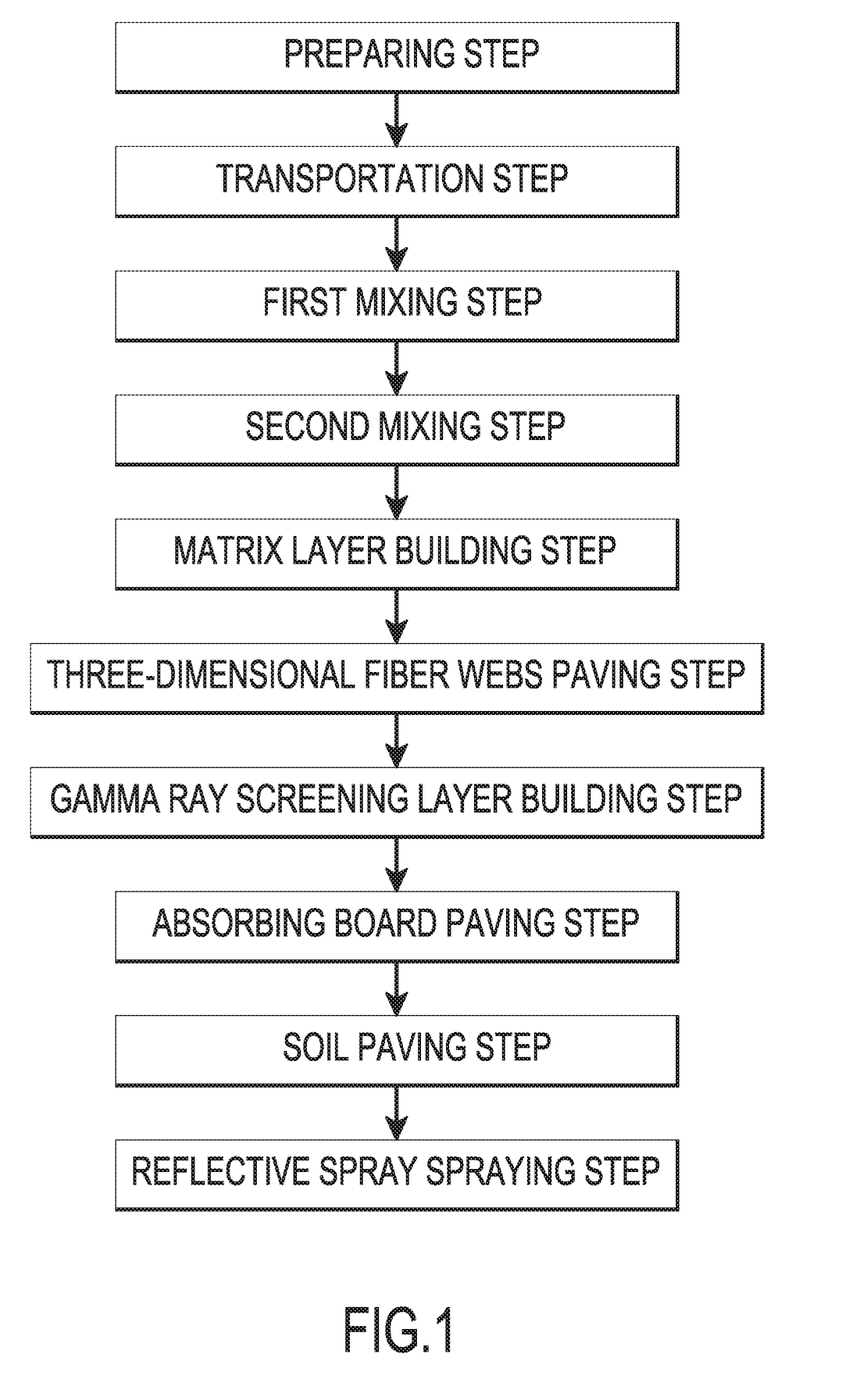
FIG. 1 is a flow diagram of a method of constructing a space construction in accordance with the present invention.

With reference to FIG. 1, a method of constructing a space construction in accordance with the present invention comprises the following steps:

A. A preparing step: prepare a spacecraft, an agitator, a strengthening material, a composite material, multiple three-dimensional fiber webs 10, multiple gamma ray screening elements, an absorbing board 40, and a reflective spray 50. The strengthening material is composed of water, air, and a moldable and curable material such as plaster and clay. The moldable and curable material can be molded into different shapes before coagulating. After coagulating, the moldable and curable material can be formed in a fixed shape. Water and air are mixed with the moldable and curable material before the moldable and curable material coagulates. The composite material comprises cement, a matrix material, and a reinforcement material. The matrix material is composed of 18% to 28% water, 0.1% to 1% hydrogenated light paraffin, 12% to 22% titanium dioxide, 1% to 10% amorphous silicon dioxide, 43% to 53% acrylic copolymer, 2% to 12% butyl acrylate, 2-hydroxyethyl acrylate, styrene, acrylic acid, and poly(methyl methacrylate) (PMMA) by weight.

Figure 2:
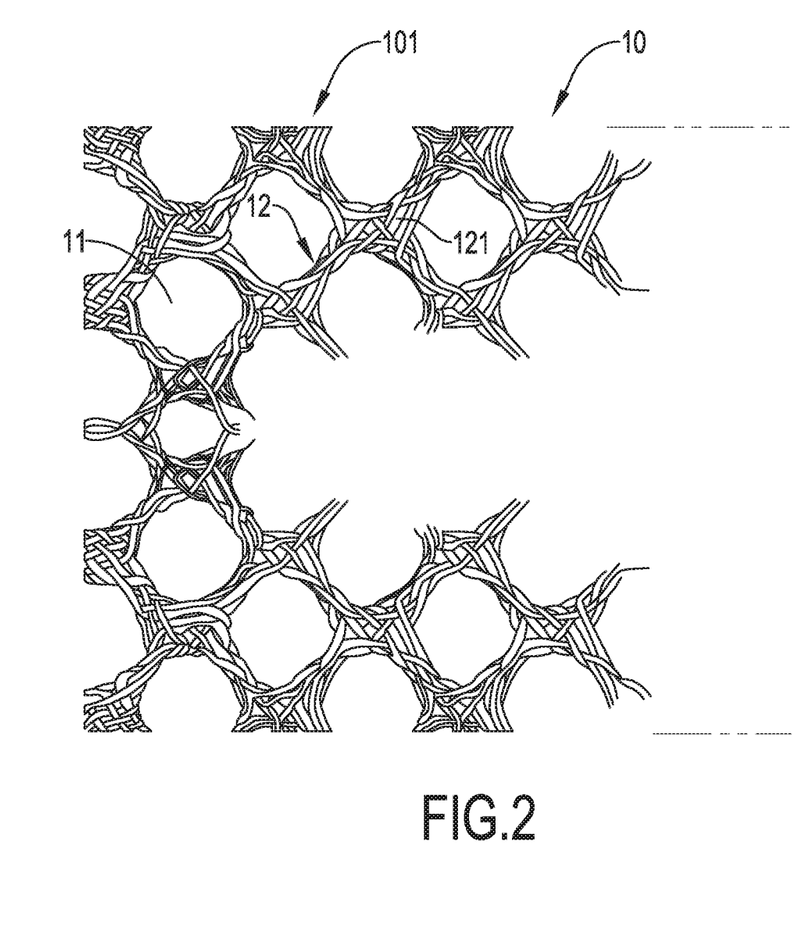
FIG. 2 is an enlarged top view of a three-dimensional fiber web in accordance with the present invention.
Figure 3:
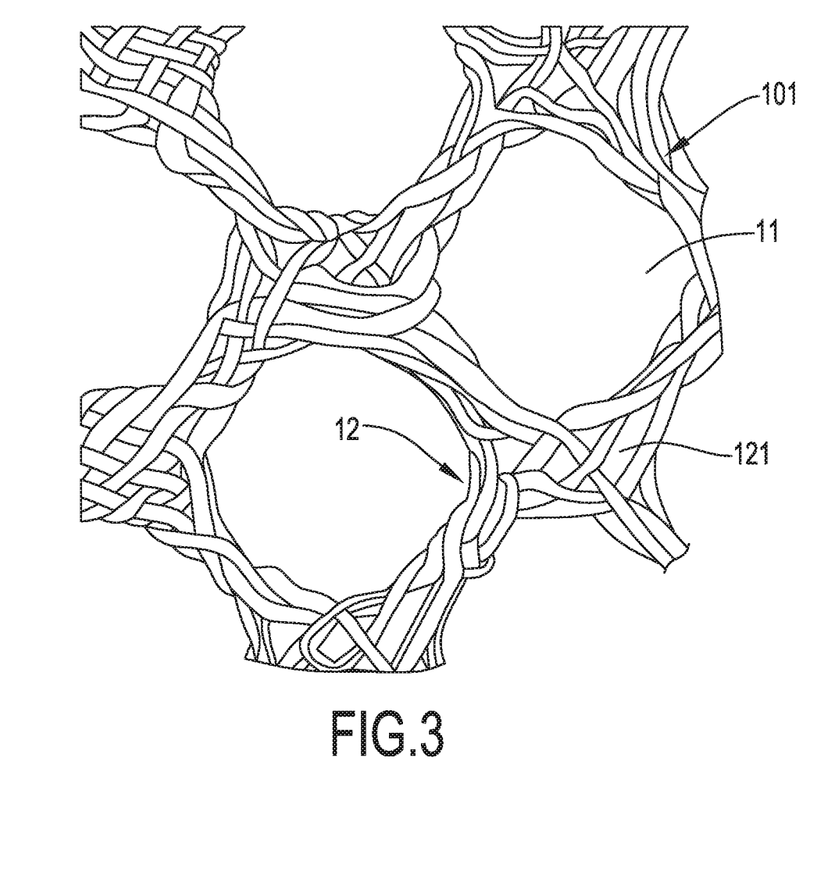
FIG. 3 is a further enlarged top view in partial section of FIG. 2.
Figure 4:
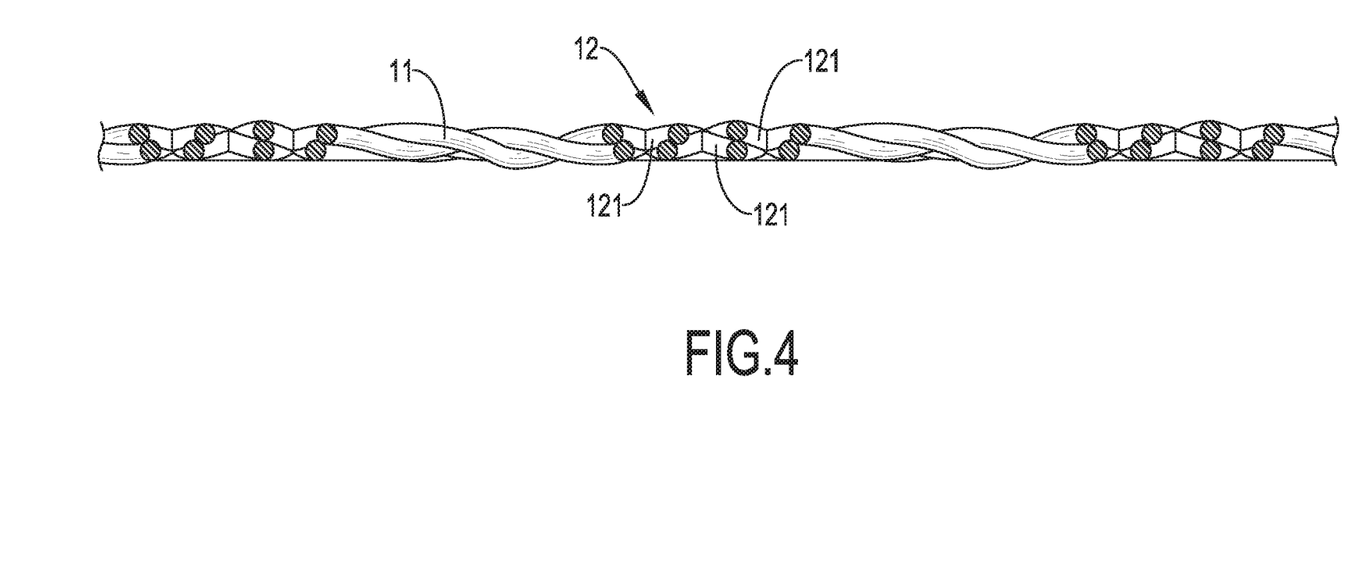
FIG. 4 is a cross-sectional side view of the three-dimensional fiber web in FIG. 2.

The reinforcement material is composed of acrylic resin, Hydroxyethyl Cellulose (HEC), calcium carbonate, and water. The reinforcement material is mixed with the cement and the matrix material to form the composite material. With reference to FIGS. 2 to 4, each one of the three-dimensional fiber webs 10 has two surfaces and multiple fiber web units 101. The two surfaces of the three-dimensional fiber web 10 respectively face two opposite directions and are disposed at a spaced interval. The multiple fiber web units 101 of the three-dimensional fiber web 10 are disposed adjacently on the three-dimensional fiber web 10. Each one of the multiple fiber web units 101 has a major through hole 11 and multiple fibers 12. The major through hole 11 is formed through the two surfaces of the three-dimensional fiber web 10. The multiple fibers 12 are braided to form the fiber web unit 101 and surround the major through hole 11 of the fiber web unit 101. Each one of the fibers 12 is braided by multiple fiber threads and has multiple minor through holes 121. Sizes of the minor through holes 121 can be different from one another. The size of each one of the minor through holes 121 of the fiber 12 is smaller than a size of each one of the major through holes 11 of the three-dimensional fiber web 10. Preferably, a contour of each one of the major through holes 11 is hexagonal. Each one of the fiber threads is made of polyester.

Each one of the multiple gamma ray screening elements comprises a glass ball and at least one kind of gas that composes the atmosphere. The glass ball is 0.5 millimeter (mm) in diameter. The at least one kind of gas that composes the atmosphere is filled in the glass ball. In the preferred embodiment, the at least one kind of gas that composes the atmosphere is ozone. Since gamma rays deplete ozone, ozone can prevent gamma rays from penetrating the gamma ray screening elements directly. Furthermore, gases that compose the atmosphere are filled in the glass ball. Because the atmosphere can absorb gamma rays, filling the glass ball with gases that compose the atmosphere is a way to screen gamma rays. The absorbing board 40 is made of lead and has a thickness. The thickness of the absorbing board 40 is 0.1 millimeter (mm). Lead can effectively attenuate gamma rays due to its high atomic number and high density. The reflective spray 50 is composed of 53% to 63% acrylic resin, 27.5% to 29.7% silicon, and 7.3% to 9.5% iron sand by weight, and the reflective spray 50 is capable of reflecting gamma rays.

B. A transportation step: Load the spacecraft with the agitator, the strengthening material, the composite material, the multiple three-dimensional fiber webs 10, the multiple gamma ray screening elements, the absorbing board 40, and the reflective spray 50. Then launch the spacecraft to a planet where people would like to construct the space construction. Preferably, the planet is Mars.

C. A first mixing step: Mix the strengthening material and the composite material with the agitator to form a first building material.

D. A second mixing step: Mix the multiple gamma ray screening elements and soil 60 on the planet with the agitator to form a second building material. Preferably, the soil 60 is Martian soil.

E. A matrix layer building step: Build at least one matrix layer 20 with the first building material in the first mixing step. Each one of the at least one matrix layer 20 has two sides.

Figure 5:
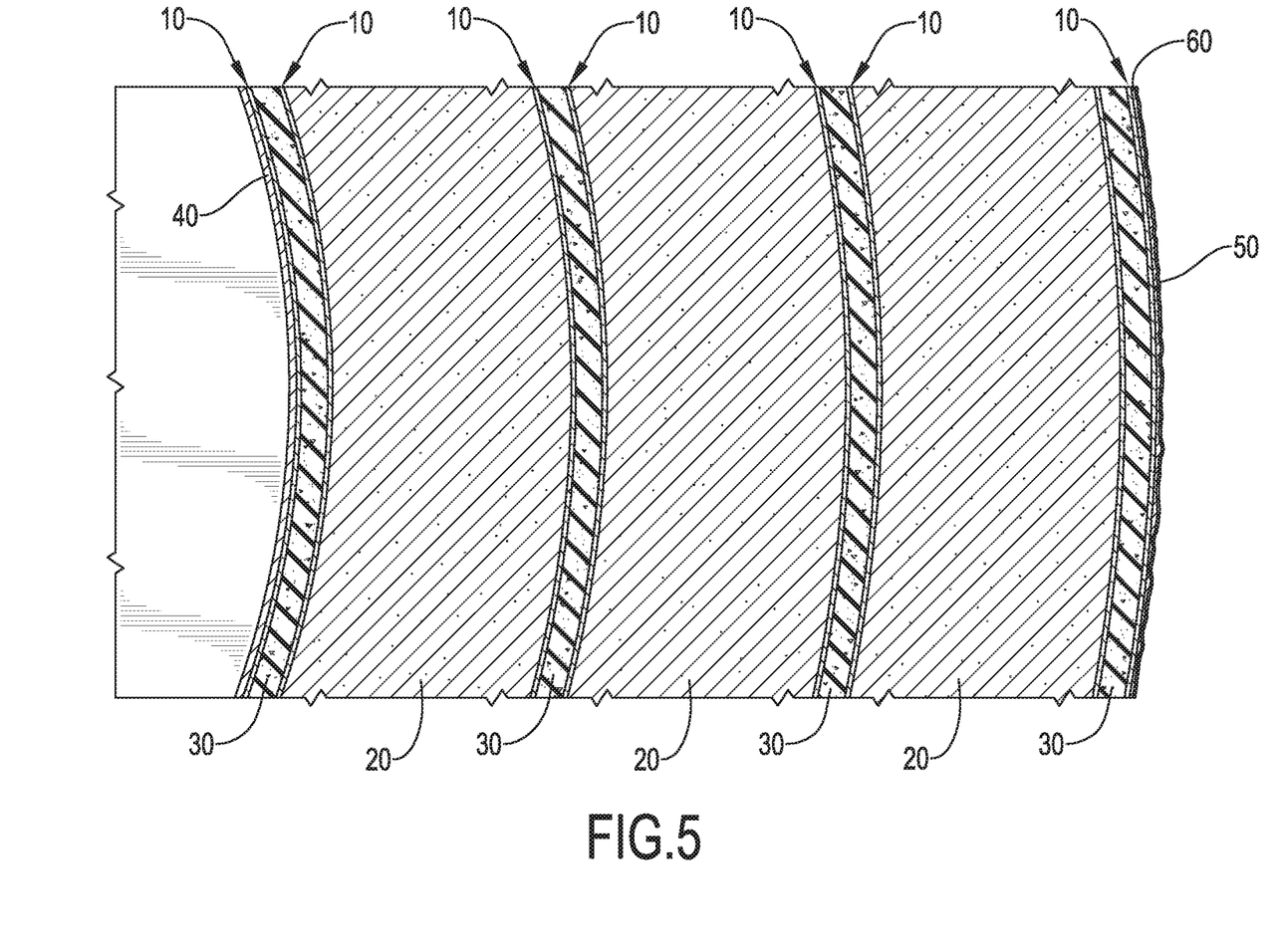
FIG. 5 is a cross-sectional top view of the space construction in accordance with the present invention.

F. A three-dimensional fiber webs paving step: Pave two of the three-dimensional fiber webs 10 on the two sides of the at least one matrix layer 20 respectively as shown in FIG. 5. Then the first building material fills in the major through holes 11 and the minor through holes 121 of each one of the two three-dimensional fiber webs 10. After the first building material coagulates, the at least one matrix layer 20 and the two three-dimensional fiber webs 10 form a structure with strength.

G. A gamma ray screening layer building step: Build at least one gamma ray screening layer 30 adjacent to one of the two three-dimensional fiber webs 10 with the second building material in the second mixing step. Numbers of the matrix layers 20, the three-dimensional fiber webs 10, and the gamma ray screening layers 30 are changeable according to practical need. Numbers of the matrix layers 20, the three-dimensional fiber webs 10, and the gamma ray screening layers 30 can be increased by repeating steps E to G. In this way, an initial structure with the matrix layers 20 and the gamma ray screening layers 30 arranged in an alternate order is built as shown in FIG. 5.

H. An absorbing board paving step: Pave the absorbing board 40 on one of the two surfaces of one of the three-dimensional fiber webs 10 away from the at least one matrix layer 20.

I. A soil paving step: Pave the soil 60 on the planet on an outer surface of the initial structure.

J. A reflective spray spraying step: Spray the reflective spray 50 on the soil 60.

Figure 6:
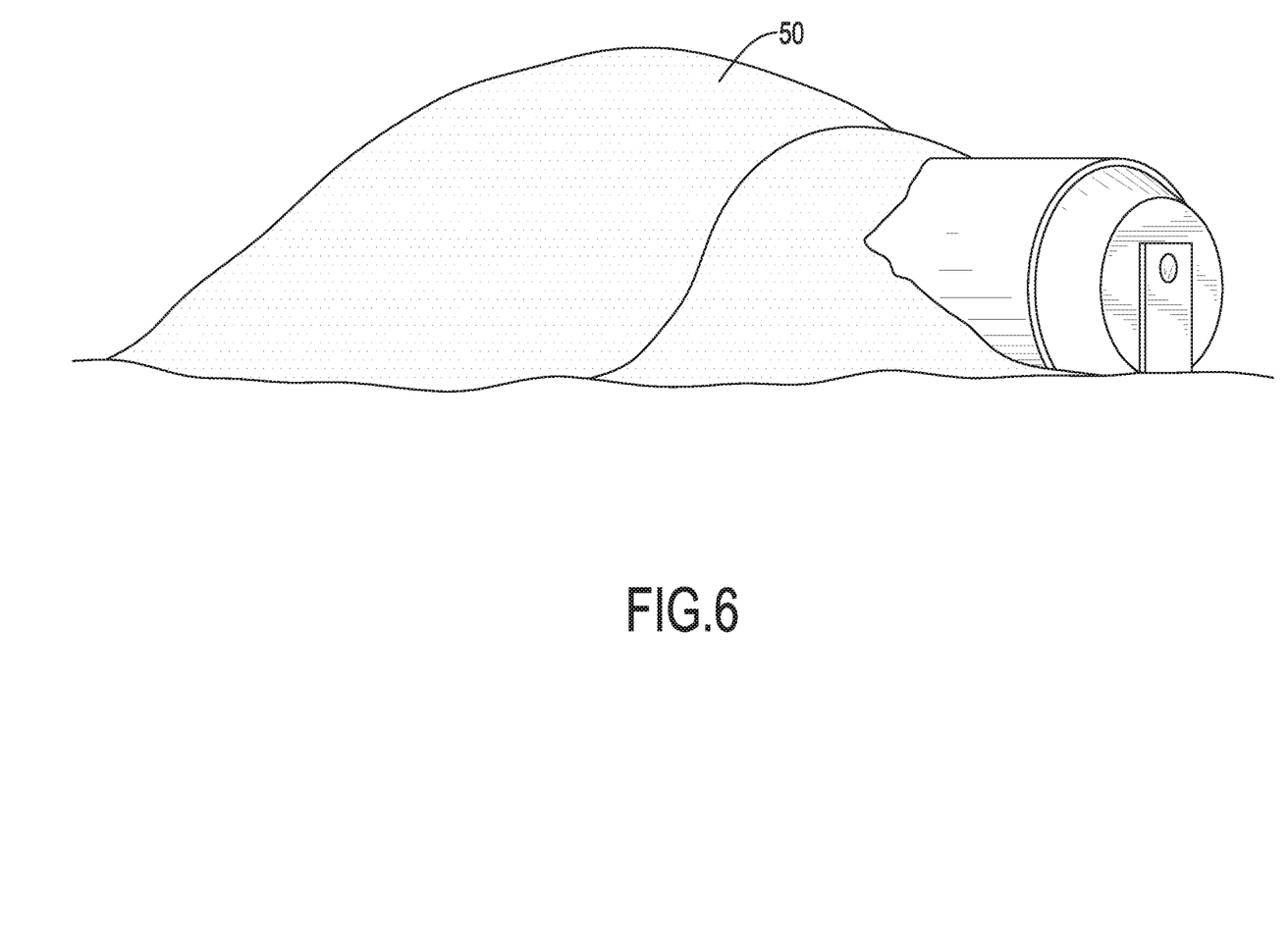
FIG. 6 is a perspective view of the space construction in FIG. 5.

By following the steps A to J, the space construction is built as shown in FIG. 6.

With the aforementioned technical characteristics, the method of constructing the space construction and product thereof has the following advantages.

1. The titanium dioxide and the silicon dioxide of the composite material in the first building material facilitate coagulating. The method of constructing the space construction in the present invention does not require a process of injecting a huge quantity of water to harden the space construction.

2. Since the at least one gamma ray screening layer 30 contains the multiple gamma ray screening elements, gamma rays are screened outside of the space construction. With reference to FIG. 5, gamma rays decay upon every encounter with the gamma ray screening layer 30. As a result, the screening effect of the space construction enhances as the numbers of the gamma ray screening layers 30 increase.

3. The absorbing board 40 can provide a last protection from the gamma rays. Since the absorbing board 40 made of lead can attenuate gamma rays, it can shield dwellers from gamma rays.

Figure 7:
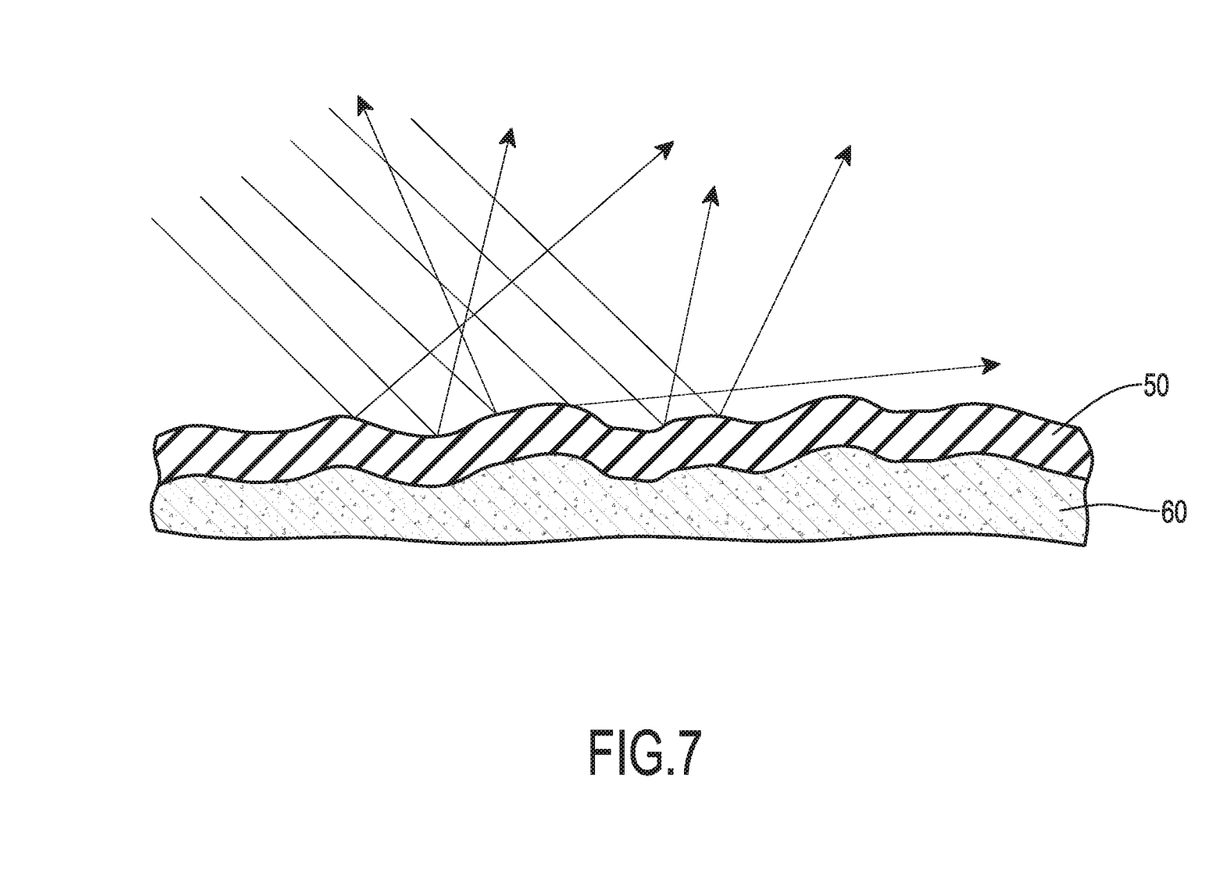
FIG. 7 is an operational side view of the space construction in FIG. 6, showing diffusion of gamma rays on an outer surface of the space construction.

4. The reflective spray 50 sprayed on the soil 60 can reflect gamma rays. Furthermore, the soil 60 paved on the initial structure makes an outer surface of the space construction uneven. The uneven outer surface of the space construction causes the diffusion of the gamma rays as shown in FIG. 7.

5. The two three-dimensional fiber webs 10 on the two sides of the at least one matrix layer 20 increase the structural strength of the space construction.

6. The first building material in the first mixing step is strong and airtight.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method of constructing a space construction comprising the following steps:
 a preparing step comprising
   preparing an agitator, a strengthening material, a composite material, multiple three-dimensional fiber webs, and multiple gamma ray screening elements;
 wherein the strengthening material is composed of a moldable and curable material, and water and air mixed with the moldable and curable material;
 the composite material comprises
   cement;
   a matrix material composed of water, hydrogenated light paraffin, titanium dioxide, amorphous silicon dioxide, acrylic copolymer, butyl acrylate, 2-hydroxyethyl acrylate, styrene, acrylic acid, and poly(methyl methacrylate); and
   a reinforcement material mixed with the cement and the matrix material to form the composite material;
 each one of the multiple three-dimensional fiber webs has
   two surfaces facing two opposite directions respectively; and
   multiple fiber web units disposed adjacently on the three-dimensional fiber web and each having
     a major through hole formed through the two surfaces of the three-dimensional fiber web; and
     multiple fibers braided to form the fiber web unit, surrounding the major through hole, and each braided by multiple fiber threads with multiple minor through holes; and
 each one of the multiple gamma ray screening elements comprises
   a glass ball; and
   at least one kind of gas composing the atmosphere and filled in the glass ball;
 a first mixing step comprising mixing the strengthening material and the composite material with the agitator to form a first building material;
 a second mixing step comprising mixing the multiple gamma ray screening elements and soil on a planet with the agitator to form a second building material;
 a matrix layer building step comprising building at least one matrix layer having two sides with the first building material in the first mixing step;
 a three-dimensional fiber webs paving step comprising paving two of the three-dimensional fiber webs on the two sides of the at least one matrix layer respectively; and
 a gamma ray screening layer building step comprising building at least one gamma ray screening layer adjacent to one of the two three-dimensional fiber webs with the second building material in the second mixing step to build up an initial structure.

2. The method of constructing a space construction as claimed in claim 1, wherein the at least one kind of gas is ozone.

3. The method of constructing a space construction as claimed in claim 1, wherein gases composing the atmosphere are filled in the glass ball.

4. The method of constructing a space construction as claimed in claim 2, wherein numbers of the matrix layers, the three-dimensional fiber webs, and the gamma ray screening layers are changeable, and the numbers of the matrix layers, the three-dimensional fiber webs, and the gamma ray screening layers can be increased by repeating the matrix layer building step, the three-dimensional fiber webs paving step, and the gamma ray screening layer building step sequentially.

5. The method of constructing a space construction as claimed in claim 4, wherein in the preparing step, an absorbing board made of lead is prepared; and the method further comprises an absorbing board paving step, paving the absorbing board on one of the two surfaces of one of the three-dimensional fiber webs away from the at least one matrix layer.

6. The method of constructing a space construction as claimed in claim 5, wherein the method further comprises a soil paving step, paving the soil on the planet on an outer surface of the initial structure.

7. The method of constructing a space construction as claimed in claim 6, wherein in the preparing step, a reflective spray is prepared; and the method further comprises a reflective spray spraying step, spraying the reflective spray composed of acrylic resin, silicon, and iron sand on the soil.

8. The method of constructing a space construction as claimed in claim 3, wherein numbers of the matrix layers, the three-dimensional fiber webs, and the gamma ray screening layers are changeable, and the numbers of the matrix layers, the three-dimensional fiber webs, and the gamma ray screening layers can be increased by repeating the matrix layer building step, the three-dimensional fiber webs paving step, and the gamma ray screening layer building step.

9. The method of constructing a space construction as claimed in claim 8, wherein in the preparing step, an absorbing board made of lead is prepared; and the method further comprises an absorbing board paving step, paving the absorbing board on one of the two surfaces of one of the three-dimensional fiber webs away from the at least one matrix layer.

10. The method of constructing a space construction as claimed in claim 9, wherein the method further comprises a soil paving step, paving the soil on the planet on an outer surface of the initial structure.

11. The method of constructing a space construction as claimed in claim 10, wherein in the preparing step, a reflective spray is prepared, and the method further comprises a reflective spray spraying step, spraying the reflective spray composed of acrylic resin, silicon, and iron sand on the soil.

12. The method of constructing a space construction as claimed in claim 7, wherein the reinforcement material is composed of acrylic resin, Hydroxyethyl Cellulose (HEC), calcium carbonate, and water.

13. The method of constructing a space construction as claimed in claim 11, wherein the reinforcement material is composed of acrylic resin, Hydroxyethyl Cellulose (HEC), calcium carbonate, and water.

14. The method of constructing a space construction as claimed in claim 12, wherein
the matrix material is composed of 18% to 28% water, 0.1% to 1% hydrogenated light paraffin, 12% to 22% titanium dioxide, 1% to 10% amorphous silicon dioxide, 43% to 53% acrylic copolymer, 2% to 12% butyl acrylate, 2-hydroxyethyl acrylate, styrene, acrylic acid, and poly(methyl methacrylate) by weight; and
the reflective spray is composed of 53% to 63% acrylic resin, 27.5% to 29.7% silicon, and 7.3% to 9.5% iron sand by weight.

15. The method of constructing a space construction as claimed in claim 13, wherein
the matrix material is composed of 18% to 28% water, 0.1% to 1% hydrogenated light paraffin, 12% to 22% titanium dioxide, 1% to 10% amorphous silicon dioxide, 43% to 53% acrylic copolymer, 2% to 12% butyl acrylate, 2-hydroxyethyl acrylate, styrene, acrylic acid, and poly(methyl methacrylate) by weight; and
the reflective spray is composed of 53% to 63% acrylic resin, 27.5% to 29.7% silicon, and 7.3% to 9.5% iron sand by weight.

16. A space construction comprising:
at least one matrix layer having two sides and composed of:
a strengthening material composed of:
a moldable and curable material; and
water and air mixed with the moldable and curable material; and
a composite material comprising:
cement;
a matrix material composed of water, hydrogenated light paraffin, titanium dioxide, amorphous silicon dioxide, acrylic copolymer, butyl acrylate, 2-hydroxyethyl acrylate, styrene, acrylic acid, and poly(methyl methacrylate); and
a reinforcement material mixed with the cement and the matrix material to form the composite material;
at least two three-dimensional fiber webs paved on the two sides of the at least one matrix layer respectively, and each one of the at least two three-dimensional fiber webs having
two surfaces facing two opposite directions respectively;
multiple fiber web units disposed adjacently on the three-dimensional fiber web and each having
a major through hole formed through the two surfaces of the three-dimensional fiber web; and
multiple fibers braided to form the fiber web unit, surrounding the major through hole, and each braided by multiple fiber threads with multiple minor through holes; and
at least one gamma ray screening layer adjacent to one of the at least two three-dimensional fiber webs and composed of
multiple gamma ray screening elements, and each one of the multiple gamma ray screening elements comprising
a glass ball; and
at least one kind of gas composing the atmosphere and filled in the glass ball; and
soil on a planet mixed with the multiple gamma ray screening elements.

17. The space construction as claimed in claim 16, wherein the at least one kind of gas is ozone.

18. The space construction as claimed in claim 16, wherein gases composing the atmosphere are filled in the glass ball.

19. The space construction as claimed in claim 17, wherein numbers of the matrix layers, the three-dimensional fiber webs, and the gamma ray screening layers are changeable.

20. The space construction as claimed in claim 18, wherein numbers of the matrix layers, the three-dimensional fiber webs, and the gamma ray screening layers are changeable.

* * * * *